Figure 1:
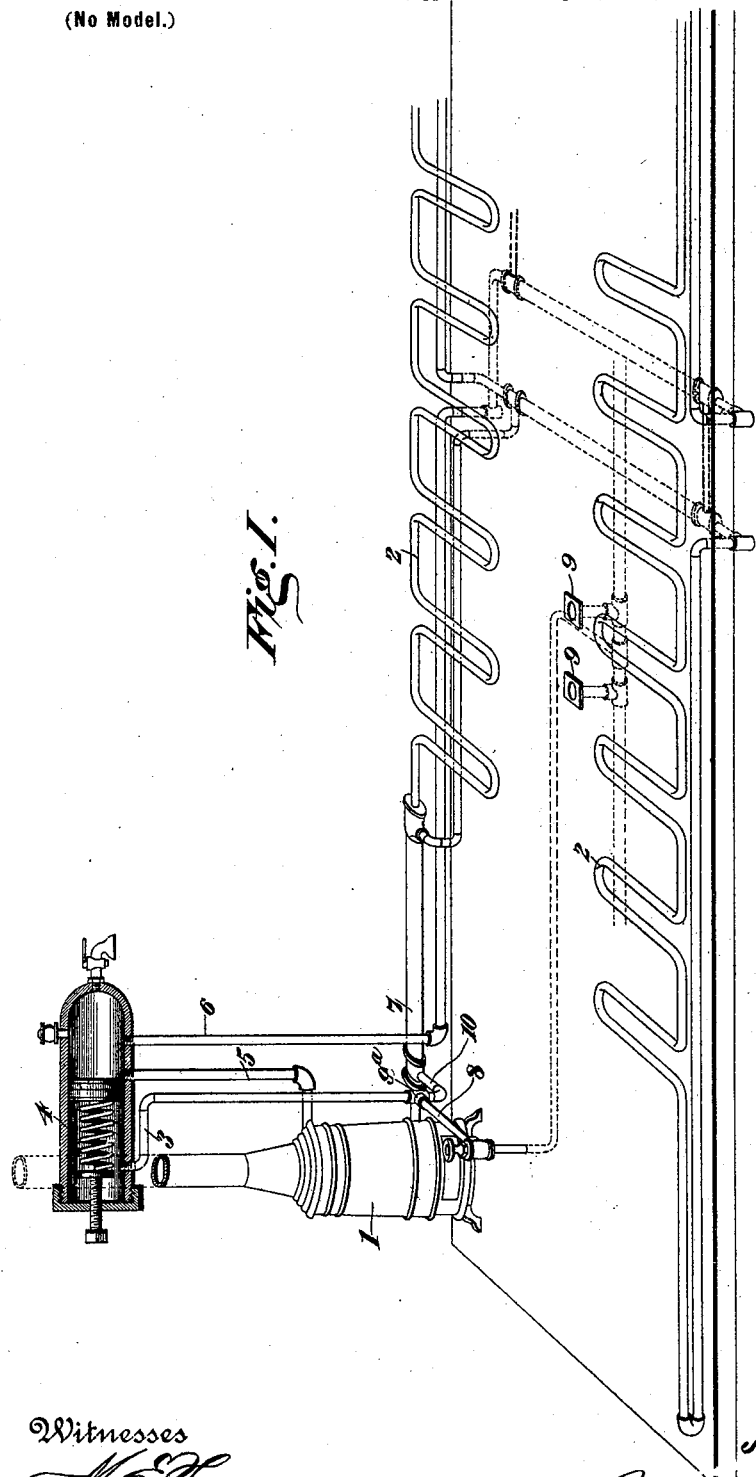

No. 618,953. Patented Feb. 7, 1899.
J. L. CREVELING.
APPARATUS FOR PREVENTING POUNDING OR WATER HAMMERING IN CIRCULATING PIPES OF HEATING SYSTEMS.
(Application filed Sept. 8, 1897.)
(No Model.) 4 Sheets—Sheet 1.

Witnesses
M. Fowler
Chester A. Baker.

Inventor:
John L. Creveling
B. Joseph F. Atkins
Attorney.

No. 618,953. Patented Feb. 7, 1899.
J. L. CREVELING.
APPARATUS FOR PREVENTING POUNDING OR WATER HAMMERING IN CIRCULATING PIPES OF HEATING SYSTEMS.
(Application filed Sept. 8, 1897.)
(No Model.) 4 Sheets—Sheet 2.
Fig. I.ᵃ
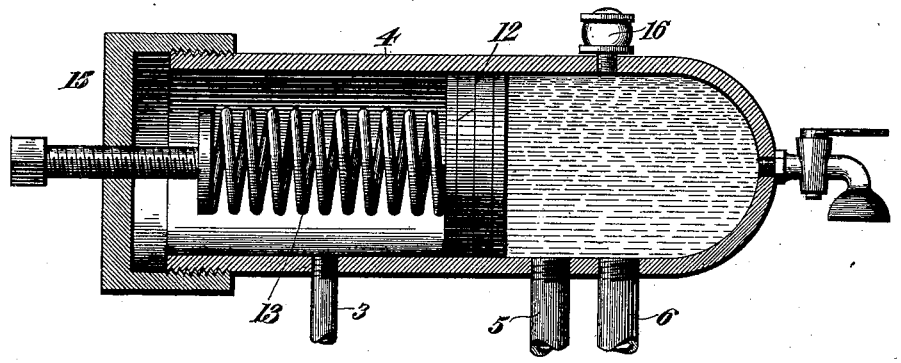
Fig. II.
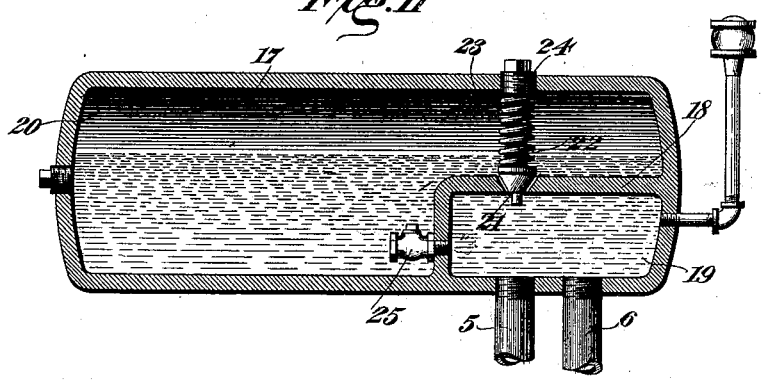
Fig. III.
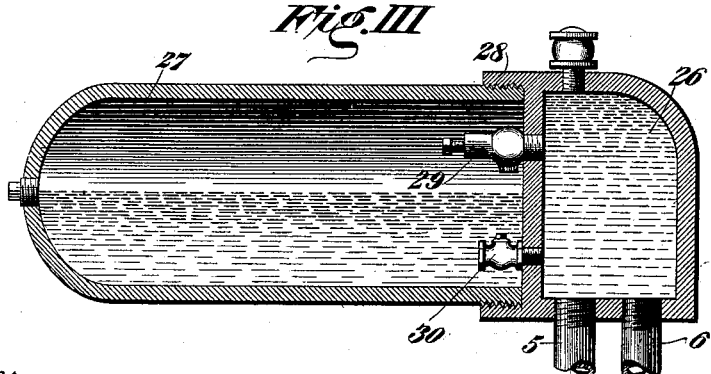
Witnesses
M. Fowler
Chester A. Baker.
Inventor:
John L. Creveling,
By James L. Atkins,
Attorney.

No. 618,953. Patented Feb. 7, 1899.
J. L. CREVELING.
APPARATUS FOR PREVENTING POUNDING OR WATER HAMMERING IN CIRCULATING PIPES OF HEATING SYSTEMS.
(Application filed Sept. 8, 1897.)
(No Model.) 4 Sheets—Sheet 3.
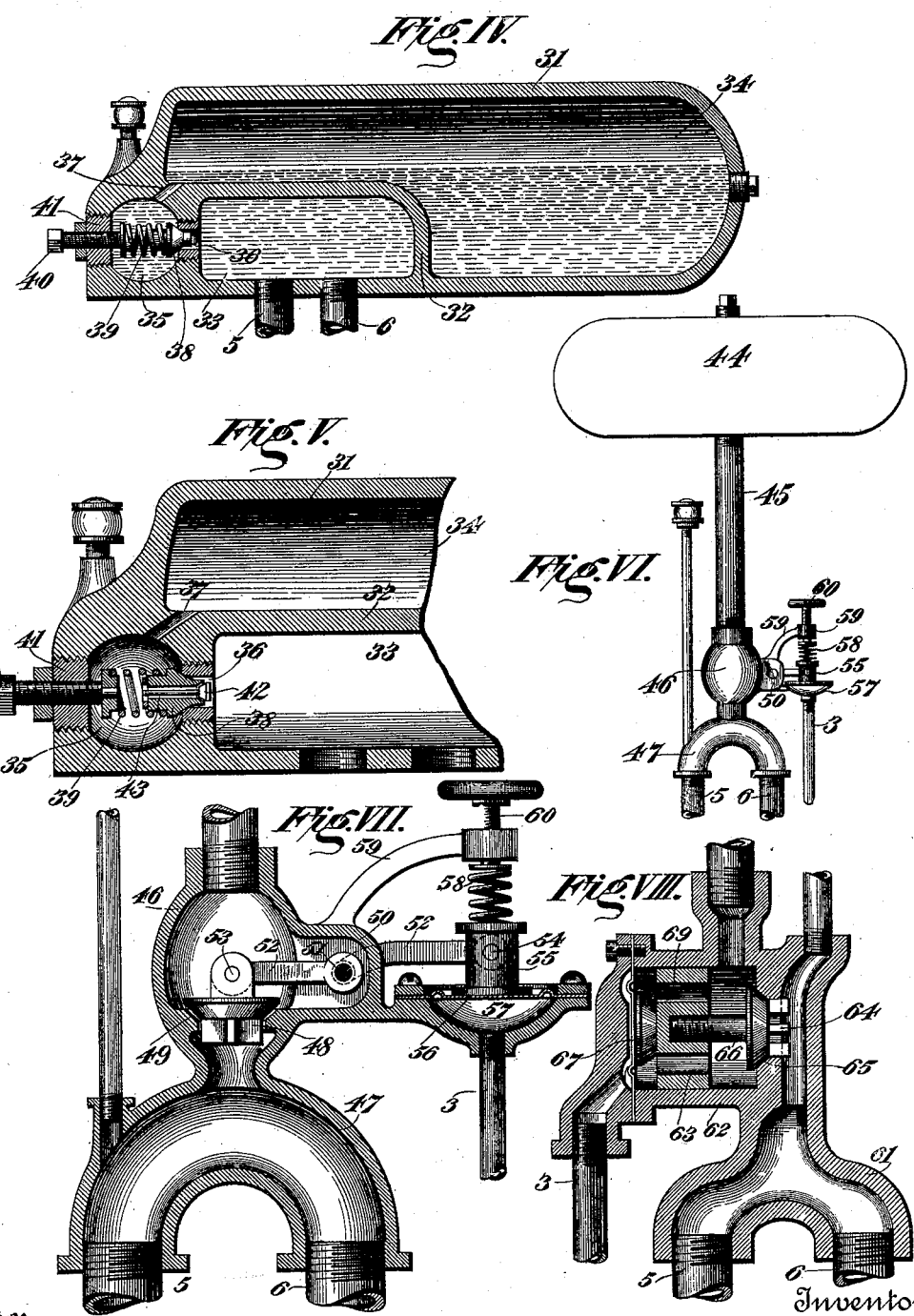

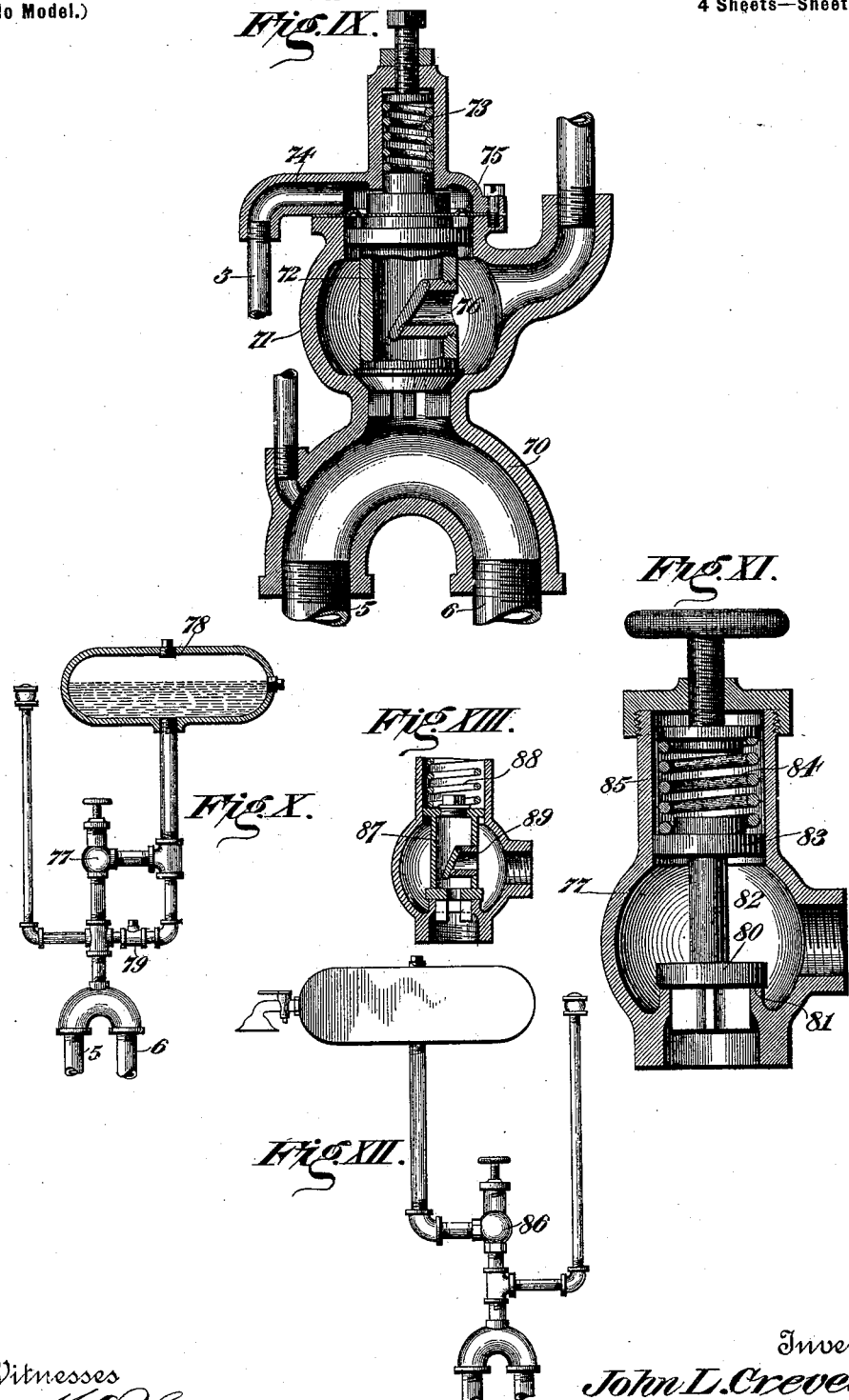

UNITED STATES PATENT OFFICE.

JOHN L. CREVELING, OF NEW YORK, N. Y., ASSIGNOR TO THE SAFETY CAR HEATING AND LIGHTING COMPANY, OF NEW JERSEY.

APPARATUS FOR PREVENTING POUNDING OR WATER-HAMMERING IN CIRCULATING-PIPES OF HEATING SYSTEMS.

SPECIFICATION forming part of Letters Patent No. 618,953, dated February 7, 1899.

Application filed September 8, 1897. Serial No. 650,974. (No model.)

*To all whom it may concern:*

Be it known that I, JOHN L. CREVELING, of New York, in the county of New York, State of New York, have invented new and useful Apparatus for Preventing Pounding or Water-Hammering in the Circulating-Pipes of Heating Systems, of which the following is a complete specification, reference being had to the accompanying drawings.

My invention relates to improvements in apparatus for preventing pounding or water-hammering in the circulating-pipes of heating apparatus, particularly of car-heaters belonging to that class in which a circulatory medium within the circulating-pipes is heated by means of a heating medium in operative contact with the circulatory medium, but not in communication with it. Water-hammering in apparatus of this description is occasioned by the formation from the circulatory medium within the pipes through which it circulates of minute steam bubbles. Formation of steam within the circulatory medium is not essential to the circulation of the medium, and I propose as one feature of my invention to eliminate water-hammering by providing means for resisting the expansive force of the circulatory medium in proportion to the heat or, as is equivalent, to the pressure of the heating medium, thereby raising the boiling-point of the circulatory medium to such a degree as will prevent the generation therefrom of steam.

Another feature of my invention comprehends the employment of a continuous circuit provided with a yielding wall or member for the accommodation of the circulatory medium. By this means provision is made for bringing the circulatory medium into direct and continuous contact at all points with said circuit instead of permitting contact, as in an expansion-drum, with an inclosed volume of air, the expansion-drum, with its air-space, being present in other systems of the class to which my invention belongs. The yielding wall or member referred to is adapted to permit overflow of the circulatory medium when the latter is expanded by heat, and provision is also preferably made for permitting reflux of the circulatory medium when the volume thereof is reduced, as by cooling or other causes.

In the accompanying drawings, Figure I is a perspective view of a car-heater of the class above referred to, showing a system of circulating-pipes equipped with my apparatus, the expansion-drum thereof, within which is comprehended the embodiment of my invention, being shown in section. Fig. I$^a$ is a view of the drum as shown in Fig. I upon an enlarged scale. Fig. II is a sectional view of a modified form of my machine. Fig. III is a similar view of a further modification. Fig. IV is a similar view of another modification. Fig. V is a detail section view of the valve mechanism shown in Fig. IV. Fig. VI is a side elevation of another modification. Fig. VII is a sectional view of the valve employed therein. Fig. VIII is a sectional view of a modification of a valve applicable to the construction of apparatus shown in Fig. VI. Fig. IX is a sectional view of a further modification of the valve applicable to the construction shown in Fig. VI. Fig. X is a view of another modification, partially in section. Fig. XI is a sectional view of the valve illustrated in Fig. X. Fig. XII is a side elevation of another modification. Fig. XIII is a sectional view of the valve illustrated in Fig. XII.

Referring to the figures on the drawings, 1 indicates a Baker heater, (illustrated merely, by way of example, of a local heater,) and 2 indicates a portion of a local fluid circulatory system or circuit, as of a car, which includes a heating-coil within the stove 1. It communicates, as through a pipe 5, with an expansion-drum 4.

6 indicates a pipe which constitutes the other branch of the fluid circulatory system, with which the pipe 5 communicates through the usual heating-coils 2 of my system.

7 indicates, by way of example, a heating-jacket, by means whereof steam from the train-pipe or locomotive is brought into operative contact with the circulatory medium of the circulating system, which comprehends the pipes 5 and 6, above referred to.

8 indicates a steam-pipe which establishes communication between the usual train-pipe and a three-way cock or two straightway cocks, as shown at 9. From the T $9^a$ two pipes 10 and 3 depart, one to the interior of the jacket 7 and the other to the interior of the drum 4.

The pipe 5 communicates with the drum 4 at a point separated from the point of communication therewith of the pipe 3.

The pipe 5, which is a continuation of the coils 2, passing through the jacket 7 in the form of jacket illustrated, is adapted in the usual manner to derive heat from the steam communicated from the train-pipe to the interior of the jacket 7.

The above-described elements are merely illustrative of any system to which my invention in some of its forms is applicable, and so far as specified above do not constitute any part of my present invention.

My invention comprehends the incorporation within the fluid-circulating system of mechanical means for repressing the expansive force of the circulatory medium, usually designated as "brine," so as to raise the boiling-point in the manner and for the purpose previously specified. The repression of the expansive force of the circulatory medium should be proportionate to the heat or, which is equivalent, to the steam-pressure supplied to the interior of the jacket 7. Such repression beyond certain limits is impracticable, and for that reason I oppose a yielding wall or member against the volume of brine confined within the circulating system and regulate the resistance afforded by such yielding member proportionately to the steam-pressure or, in equivalent terms, the steam-heat supplied from the train-pipe to the jacket 7. The resistance member may be regulated by various mechanical means—as, for example, metallic springs or the like—or by a fluid resistance, such as is obtainable, for example, from a confined volume of gas—for example, steam.

In Fig. $I^a$ the expansion-drum 4 shown therein illustrates one form of embodiment of my invention. In that figure the yielding member consists of a piston 12, fitting tightly within the interior of the drum and opposed to the volume of brine supplied to the interior of the drum through the pipes 5 and 6. Upon the side of the piston opposite to that opposed to the brine within the circulating-pipes I provide means of affording required resistance. The purely mechanical means illustrated consists of a coiled spring 13, whose tension is controllable by means of a screw screwing in a screw-cap 15, that is secured, as by screw-threads, to the end of the drum. The pipe 3 also is adapted to supply steam to the interior of the drum behind the piston 12. The steam from the pipe 3, being under substantially the same pressure as that supplied from the train-pipe, affords a resistance to the backward movement of the piston directly proportionate to the expansive force of the brine in front of the piston, the expansive force of the brine being derived from the heat supplied from the steam of the train-pipe. The spring 13 or equivalent mechanism and the steam supplied from the pipe 3 may be used together or singly, as may be preferred.

16 indicates a safety-vent which communicates with the interior of the drum in front of the piston 12.

In the figures of the drawings following Fig. $I^a$ the form of the expansion-drum is somewhat modified and will be assigned in each modification a distinct reference-numeral. The pipes 3, 5, and 6, however, and the safety-vent where employed are substantially the same in each instance and for the purpose of identification without special description will be assigned the same reference-numerals throughout.

In Fig. II is illustrated a drum 17, whose interior is separated, as by a fixed partition 18, into chambers 19 and 20. The chamber 19 communicates directly with the pipes 5 and 6 and in common with them contains the circulatory medium or brine. The wall 18 is provided with a suitable valve-seat, in which is set a relief-valve 21, guided by a valve-stem 22. A coiled spring 23, surrounding the valve-stem and seated at one end against the wall of the drum 17 or screw-block 24, working therein, and at the other end against the valve 21, serves to yieldingly force the valve into its seat, the tension of the spring 23 being adapted to oppose the requisite resistance to the expansion of the brine present within the chamber 19. In this form of apparatus the brine within the circulating system expands immediately upon the application of heat to the jacket 7; but its expansion is resisted by the valve 21, which does not yield until the requisite pressure is attained within the circulating system. The pressure, as above specified, is such as to prohibit the generation of steam within the brine under the degree of heat applied to the jacket. The chamber 20 is designed to accommodate such overflow of brine from the chamber 19 as may be occasioned through the expansion of the brine and the yielding of the valve 21. After the brine has been expanded by heat and afterward cools, as when the car is taken out of service, it contracts. Therefore in order to provide at all times a sufficient volume of brine within the circulating system I employ in this form of embodiment of my invention a suitable check-valve 25, which opens toward the chamber 19. Consequently when pressure within the chamber is relieved the brine from the chamber 20 flows back into and fills the chamber 19.

In Fig. III a two-part expansion-drum is illustrated, one part, 26, defining a chamber corresponding to the chamber 19 and the other part, 27, defining a chamber corresponding to the chamber 20. The part 27 may be screwed into a flange 28 upon the part 26, as illustrated. 29 indicates a yielding valve corresponding in function to the valve 21. 30 indicates a check-valve corresponding in function to the valve 25.

In Figs. IV and V an expansion-drum 31 is illustrated, divided, as by a partition-wall 32, into chamber 33, corresponding to the chamber 19, and the chamber 34, corresponding to the chamber 20. In these figures an intermediate chamber 35 is illustrated which communicates, through the valve-seat 36, with the chamber 33 and through a passage 37 with the chamber 34. (See particularly Fig. V.) The valve-seat 36 is closed by a valve 38, yieldingly urged to place, as by a coiled spring 39, whose tension is controllable, as by means of a screw 40, working in a nut 41, screwing into a suitable threaded aperture provided for it in the wall of the drum 31. The feature of this modification is the incorporation of a check-valve 42 within the valve 38, which is provided with an internal bore 43, that communicates with the interior of the intermediate chamber 35.

In Figs. VI and VII, I illustrate an ordinary expansion-drum 44, which, through a pipe 45 and valve-case 46, communicates with a return-coupling 47, that unites the pipes 5 and 6. In this form of embodiment of my invention a valve 48, set within a valve-seat 49, is controllable by means external to the valve-case, which for that purpose is provided with an offset 50, within which, as indicated at 51, is pivoted a valve-lever 52, that is pivoted at one end, as indicated at 53, to the valve 48 and at the other end, as indicated at 54, to a hub 55. To the hub 55 is secured a flexible diaphragm 56, that forms a close cover for a dish-shaped compartment 57 upon the valve-case 46. The pipe 3 communicates with the interior of the chamber defined by the dish-shaped compartment 57 and the diaphragm 56, so as to communicate pressure through the lever 52 to the valve 48. A coiled spring 58, confined against the hub 54, as by an arm 59, extending from the valve-case 46, is adapted to open the valve 48 when pressure in the pipe 3 is relieved, and thereby permit reflux of brine to the system when required. A tension-screw 60 is provided in the arm 59 for regulating the power of the spring 58.

In Fig. VIII a form of valve mechanism applicable to apparatus as illustrated in Fig. VII is shown in which the return-coupling 61 is incorporated with the valve-case 62, within the interior of which is fitted a piston 63, which serves to guide the movement of the valve 64 to and from its seat 65, the valve-stem 66 being secured at its end opposite the valve to the piston 63. The piston 63 derives its resistance from steam-pressure supplied from the pipe 3 behind a diaphragm 67, the diaphragm being secured, as by screws, to the valve-case.

In Fig. IX, I illustrate a form of valve mechanism closely analogous to that shown and described in Fig. VIII. In that figure, 70 indicates the return-coupling, and 71 the valve-case incorporated therewith. 72 indicates a valve controllable as by a spring 73 or by pressure supplied from the pipe 3 to the passage 74 behind a diaphragm 75, or by both steam-pressure and spring-pressure, if desired. The valve 72 in this instance is a hollow structure designed to accommodate a check-valve 76, corresponding in office and relative location to the valve 42, previously described.

In Fig. X the relief-valve case 77 is shown exterior to the drum 78, as is likewise the check-valve 79. By this means the simple form of relief-valve illustrated in Fig. XI is rendered available in connection with my apparatus. The valve mechanism illustrated in Fig. XI consists simply of the casing 77, containing the valve 80, a valve-seat 81, valve-stem 82, guide-head 83, and resistance-spring 84, the guide-head and resistance-spring being contained within the box-head 85 of the case 77.

Figs. XII and XIII illustrate relief-valve mechanism analogous to that shown in Figs. X and XI, incorporated with a check-valve. In those figures, 86 indicates a valve-case, 87 the valve, and 88 the resistance-spring. The valve 87 is distinguished from the valve 80 by its hollow structure, which is designed to accommodate a check-valve 89, the valve 87 and valve 89 corresponding substantially to the valves 72 and 76, previously described.

The operation of my invention will appear upon consideration of the foregoing specification in view of the accompanying drawings, and does not require more detail description than that given in the general description of the invention and the description of the several figures on the drawings.

What I claim is—

1. The combination with a continuous circuit defining the course of a liquid circulatory medium, said circuit being provided with a yielding wall or member, of a heating medium in operative contact with but not in communication with said circulatory medium, said liquid circulatory medium making direct and continuous contact at all points with the said circuit, substantially as set forth.

2. The combination with a continuous circuit defining the course of a liquid circulatory medium, said circuit being provided with a yielding wall or member, of a heating medium in operative contact with, but not in communication with, said circulatory medium, said circulatory medium making direct and continuous contact at all points with said circuit, and means for retaining such portion of the circulatory medium as may occasion, by expansion, the movement of the yielding wall, substantially as set forth.

3. The combination with a liquid-circulating system, of a heating medium consisting of a fluid under pressure in operative proximity to said system, a resistant member opposed to the expansion of the circulatory medium within the circulating system, and means for varying the resistance to the expansion of the circulatory medium, in proportion to the pressure of the heating medium, substantially as specified.

4. The combination with the circulating system of a fluid-heating apparatus, of a yieldingly-resistant member opposed against the expansion of the circulatory medium contained within the system, means for applying steam to the circulating system to heat the circulatory medium within the same, and means for applying pressure of the said steam behind the yielding member to hold it in place, substantially as set forth.

5. The combination with the circulating system of a fluid-heating apparatus, of a yieldingly-resistant member opposed against the expansion of the circulatory medium contained within the system, means for applying steam to the circulating system to heat the circulatory medium within the same, a case protecting the yielding member, and means external to the case for applying the pressure of the steam to hold the yielding member against the expansive force of the circulatory medium to which it is opposed, substantially as set forth.

6. The combination with the circulating system of a fluid-heating apparatus, of a yieldingly-resistant member opposed against the expansion of the circulatory medium contained within the system, a flexible diaphragm operatively connected with the yielding member, means of applying steam to the circulating system to heat and expand the circulatory medium within the same, and means of applying steam-pressure behind the flexible diaphragm to impel the yielding member against the expansive force of the heated circulatory medium, substantially as set forth.

7. The combination with the circulating system of a fluid-heating apparatus, of a yieldingly-resistant member opposed against the expansion of the circulatory medium contained within the system, a flexible diaphragm operatively connected with the yielding member, means of applying steam to the circulating system to heat and expand the circulatory medium within the same, means of exerting fluid-pressure behind the diaphragm to impel the yielding member toward the circulatory medium against which it is opposed, and means of operatively communicating pressure from the circulatory medium to the diaphragm, substantially as set forth.

8. The combination with the circulating system of a fluid-heating apparatus, of a relief-valve yieldingly opposed against the expansion of the circulatory medium contained within the circulating system, a receptacle for receiving such portion of the circulatory medium as may pass the relief-valve when the circulatory medium is expanded by heat, and a check-valve incorporated within the relief-valve, substantially as and for the purpose specified.

In testimony of all which I have hereunto subscribed my name.

JOHN L. CREVELING.

Witnesses:
H. G. DARWIN,
E. E. ALLBEE.